(12) United States Patent
Kamei

(10) Patent No.: US 6,320,835 B1
(45) Date of Patent: Nov. 20, 2001

(54) DISK DRIVE DEVICE HAVING A HOUSING AND A FLEXIBLE CABLE CONNECTED BETWEEN THE HOUSING AND A DISK TRAY

(75) Inventor: Yo Kamei, Kokubunji (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/185,054

(22) Filed: Nov. 3, 1998

(30) Foreign Application Priority Data

Nov. 4, 1997 (JP) .................................................... 9-302142

(51) Int. Cl.7 .................................................. G11B 33/02
(52) U.S. Cl. .............................................................. 369/75.1
(58) Field of Search ................................ 369/75.1, 75.2; 360/245.9

(56) References Cited

U.S. PATENT DOCUMENTS

| | | | |
|---|---|---|---|
| 4,679,059 | * | 7/1987 | Dagna ..................................... 347/50 |
| 4,906,803 | * | 3/1990 | Albrechta et al. .................... 174/254 |
| 5,206,118 | * | 4/1993 | Sidney et al. ......................... 430/343 |
| 5,299,944 | * | 4/1994 | Larabell et al. ...................... 439/157 |
| 5,526,208 | * | 6/1996 | Hatch et al. .......................... 360/109 |
| 5,616,418 | * | 4/1997 | Vasselin et al. .................... 428/474.7 |
| 6,058,089 | * | 5/2000 | Youens et al. ....................... 369/75.1 |
| 6,151,284 | * | 11/2000 | Watanabe et al. ................... 369/75.2 |

FOREIGN PATENT DOCUMENTS

| | | |
|---|---|---|
| 55-102289 | 8/1980 | (JP) . |
| 5-175618 A | 7/1993 | (JP) . |
| 06338185 A | 12/1994 | (JP) . |
| 07254264 A | 10/1995 | (JP) . |
| 09251769 A | 9/1997 | (JP) . |

* cited by examiner

Primary Examiner—David L. Ometz
Assistant Examiner—Franklin D. Altman, III
(74) Attorney, Agent, or Firm—Anderson, Kill & Olick, P.C.

(57) ABSTRACT

A disk tray is provided slideably between a disk ejecting position in which a disk is placed on the disk tray and a disk reproduction position in which information stored the disk is read. A housing movably supports the disk tray. Disk reproducing components are arranged in the disk tray, and include a pickup and a disk motor which drives and rotates the disk. A flexible cable connects the disk reproducing components arranged in the disk tray with a substrate provided in the housing, the flexible cable being arranged in a manner in which the flexible cable is curved. A reinforcement film is formed on a predetermined portion of a movable portion of the flexible cable, the movable portion moving with respect to the housing when the disk tray moves with respect to the housing.

2 Claims, 8 Drawing Sheets

DISK DRIVE DEVICE HAVING A HOUSING AND A FLEXIBLE CABLE CONNECTED BETWEEN THE HOUSING AND A DISK TRAY

BACKGROUND OF THE INVENTION

1. Field of the Invention

The present invention relates to a disk drive device, and to a disk drive device in which, by using a flexible cable, the rigidity of which is improved, it is prevented that, when a disk tray is received by a housing, the flexible cable is sandwiched between the disk tray and the housing.

Recently, it is demanded that a notebook-type personal computer in which the disk drive device is incorporated be made to be miniaturized and thinner. As a result, making the disk drive device itself thinner has been attempted. Thereby, a space formed between the disk tray on which a disk is placed and the housing which slideably supports the disk tray becomes narrower.

2. Description of the Related Art

As a disk drive device, there is a device which reads information recorded on a CD-ROM (simply referred to as a 'disk', hereinafter) through a laser pickup.

In such a type of disk drive device, the disk tray (simply referred to as a 'tray'hereinafter) on which the disk is loaded is provided in a manner in which the tray can slide between an ejecting position in which the disk is loaded and unloaded, and a reproducing position in which information stored in the disk is read.

FIGS. 1A, 1B shows the disk drive device 102 in the related art. As shown in FIG. 1A, in the tray 106 which is included in the disk drive device 102, a turntable 134 on which the disk is placed and which rotates the disk, a pickup portion (not shown in the figures) which optically detects information recorded on the disk, and so forth are provided.

A flexible cable 110 is provided between the tray 106 and a housing 104. The flexible cable 110 is curved in accordance with a position relationship between the tray 106 and the housing 104. Further, the flexible cable 110 electrically connects a substrate 138 provided in the tray 106 with a substrate 140 provided in the housing 104. When the tray 106 moves, a movable portion 110a follows the sliding movement of the tray 106 and moves in the housing 104.

As shown in FIG. 1B, as a result of the disk drive device 102 becoming thinner, the inner space of the housing 104 becomes narrow, and, thereby, the flexible cable cannot bend gently. Accordingly, when the tray 106 is received by the housing 104, the movable portion 110a of the flexible cable 110 may come into contact with the inner surface 104a of the housing 104. In this case, due to the frictional resistance occurring as a result of the contact of the movable portion 110a with the inner surface 104a of the housing 104, a portion 110b of the flexible cable 110, which portion 110b cannot enter the housing 104, projects from the gap between the tray 106 and the housing 104.

Further, when the tray 106 continues to move into the housing 104, the projecting portion 110b of the flexible cable 110 is sandwiched between a rear end portion 106a of the tray 106 and a front end portion 104b of the housing 104. When the flexible cable 110 is thus sandwiched therebetween, the tray 106 is not completely received by the housing 104, and, also, the flexible cable 110 itself may be damaged.

SUMMARY OF THE INVENTION

The present invention is directed to eliminating the above-mentioned problems. An object of the present invention is to provide a disk drive device in which the flexible cable is prevented from projecting from the gap between the tray and the housing when the tray is received by the housing, and the tray is smoothly received by the housing.

A disk drive device, according to the present invention, comprises:

a tray which is provided movably between a disk ejecting position in which a disk is placed on the tray and a disk reproducing position in which information stored the disk is read;

a housing which movably supports the tray;

disk reproducing components, arranged in the tray, including a pickup and a disk motor which drives and rotates the disk; and a flexible cable connecting the disk reproducing components arranged in the tray with a substrate provided in the housing, the flexible cable being arranged in a manner in which the flexible cable is curved, wherein a reinforcement film is formed on a predetermined portion of a movable portion of the flexible cable, the movable portion moving with respect to the housing when the tray moves with respect to the housing.

As a result of forming the reinforcement film on the predetermined portion of the movable portion of the flexible cable, the rigidity of the predetermined portion of the movable portion is increased. As a result, the surfaces of the predetermined portion of the movable portion of the flexible cable are smooth. Thereby, when the tray is received by the housing, the contact frictional resistance between the predetermined portion of the movable portion of the flexible cable and an inner surface of the housing is small. Thereby, it is prevented that the contact frictional resistance between the predetermined portion of the movable portion of the flexible cable and the inner surface of the housing causes the movable portion of the flexible cable to not smoothly move in the housing, and, thereby, causes a portion of the movable portion of the flexible cable to project from the gap between a rear end portion of the tray and a front end portion of the housing, such that the portion of the movable portion of the flexible cable is sandwiched between the rear end portion of the tray and the front end portion of the housing. Thus, the movable portion of the flexible cable smoothly moves in response to the sliding movement of the tray so that the movable portion of the flexible portion is completely received by the housing together with the tray. As a result, it is prevented that the tray is not completely received by the housing, and, also, it is prevented that the flexible cable is damaged.

It is preferable that the reinforcement film be formed as a result of silk-screen printing of a paint. As a result, it is possible to provide the flexible cable, in which the rigidity of the predetermined portion of the movable portion is increased, through an easy manufacturing process at a low price, in comparison to a case where a reinforcement plate or the like is stuck on the predetermined portion of the movable portion of the flexible cable.

Other objects and further features of the present invention will become more apparent from the following detailed descriptions when read in conjunction with the accompanying drawings.

BRIEF DESCRIPTIONS OF THE DRAWINGS

DETAILED DESCRIPTION OF THE PREFERRED EMBODIMENT

Figures 1A, 1B:
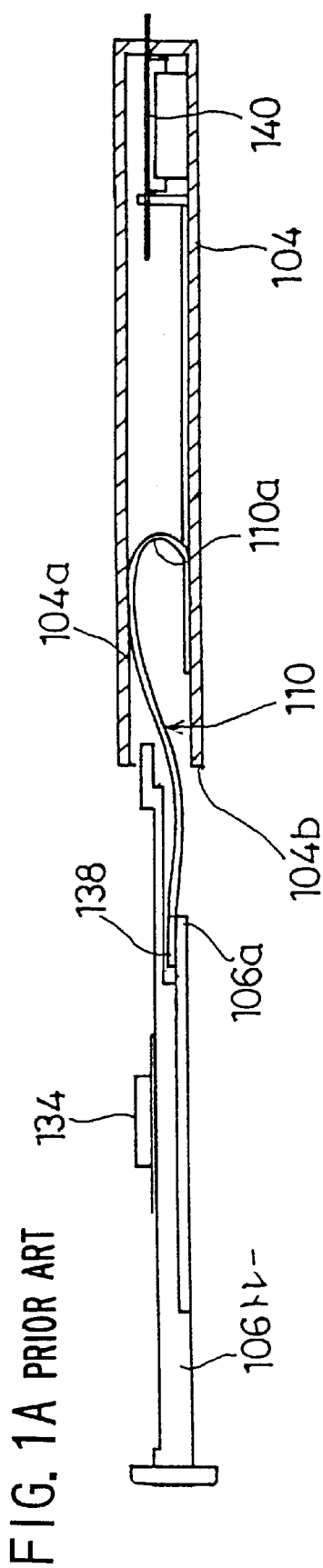
FIGS. 1A and 1B show conditions in which a tray of a disk drive device, in the related art, provided with a flexible cable, is received by a housing.

With reference to FIGS. 2 through 8B, a disk drive device 2, for a notebook-type personal computer, in one embodiment of the present invention will now be described.

In the embodiment, the disk drive device 2 is a reproducing device in which a disk is loaded.

Generally, the disk drive device 2 includes a housing 4, a tray 6 on which the disk (not shown in the figures) is placed, a tray sliding mechanism 8 which slideably supports the tray 6, a flexible cable 10 which electrically connects a substrate 40 provided in the housing 4 with a substrate 38 provided in the tray 6, a movement-preventing mechanism 12 which prevents the tray 6 from moving when the tray 6 has moved to a disk ejecting position, a locking mechanism 14 which locks the tray 6 when the tray 6 has moved to a disk reproducing position in the housing 4, and so forth.

Figure 2:
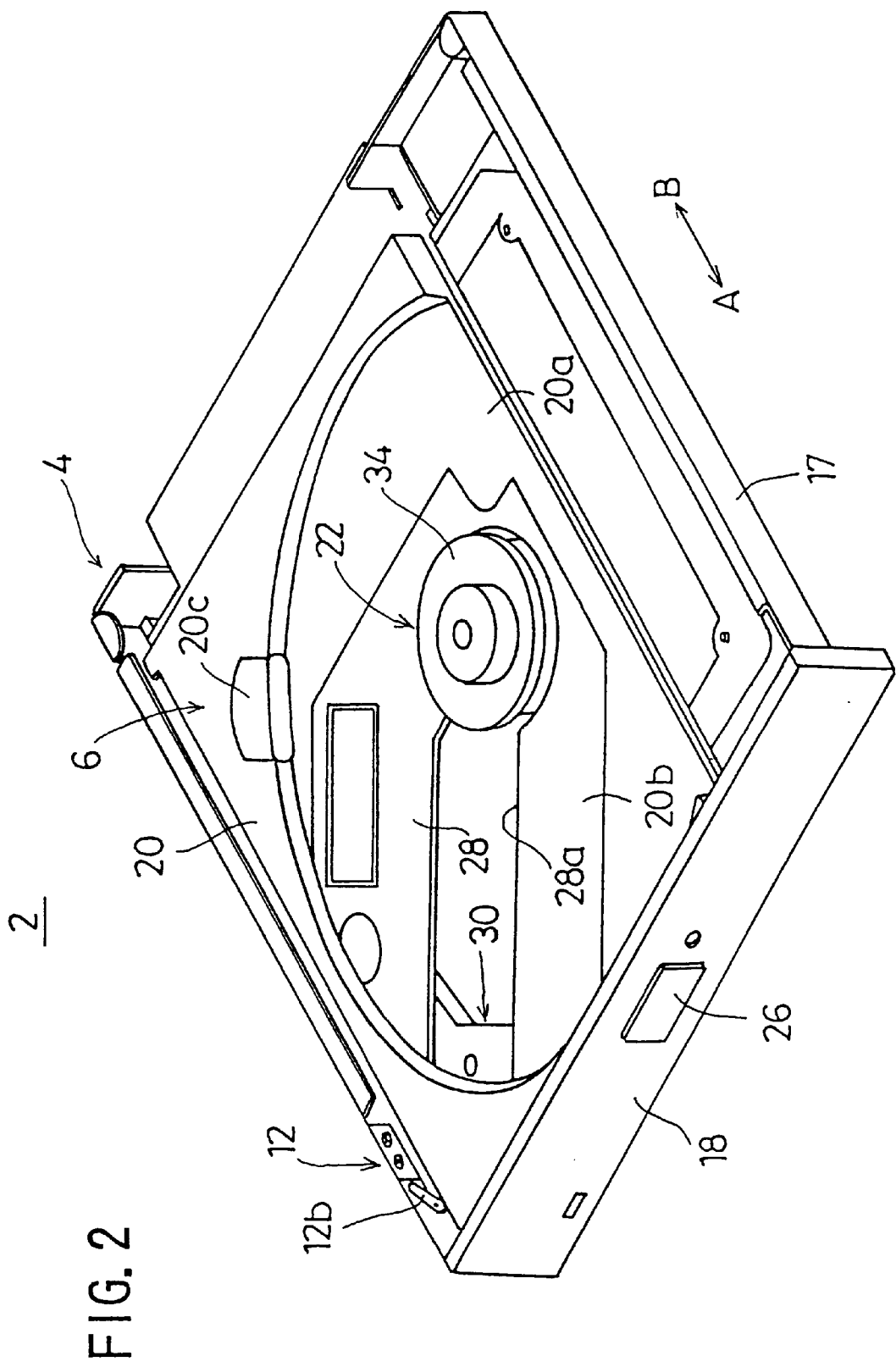
FIG. 2 shows a condition in which a tray of a disk drive device in one embodiment of the present invention is in a disk reproducing position.
Figure 3:
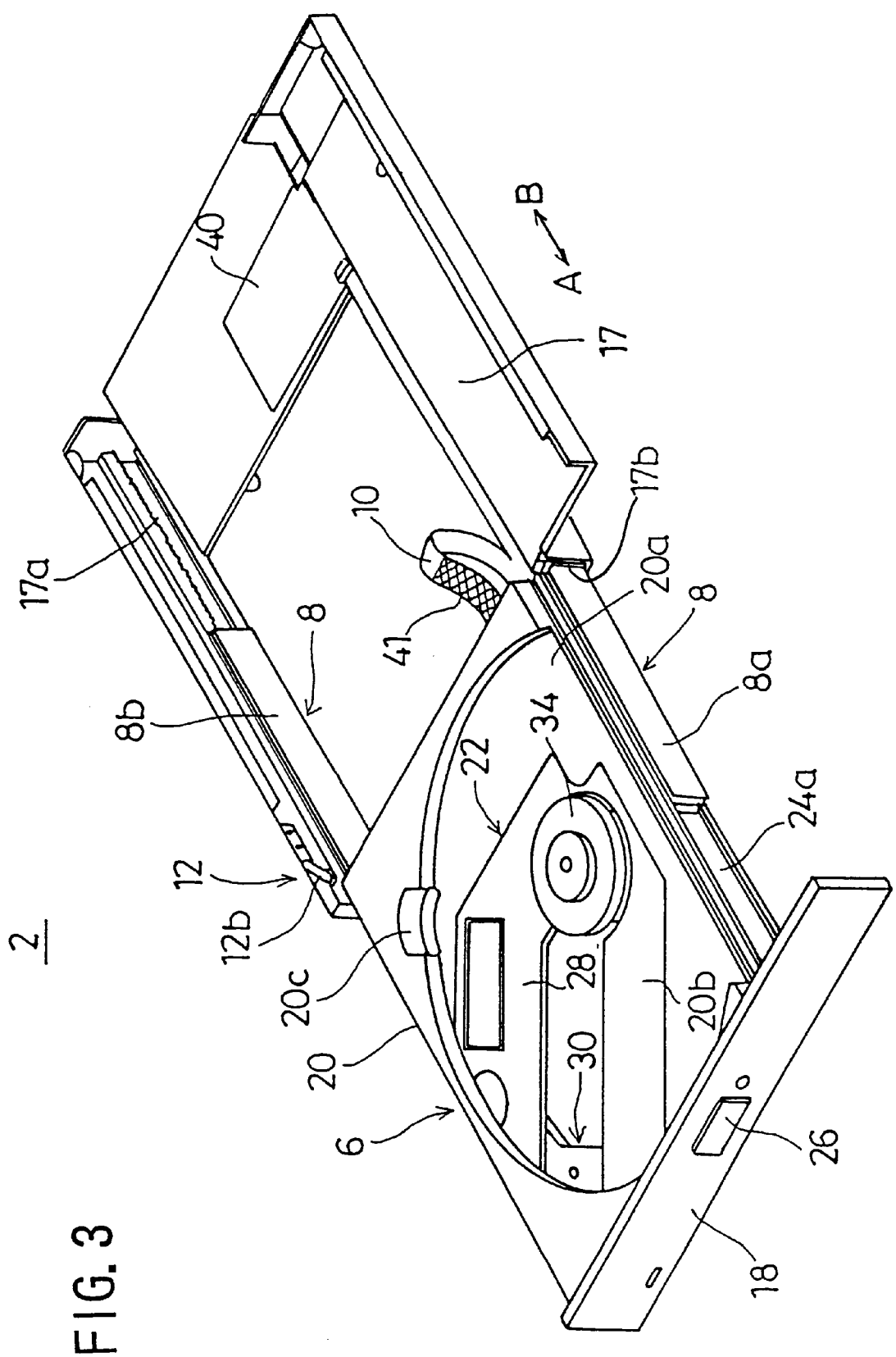
FIG. 3 shows a condition in which the tray of the disk drive device in the embodiment of the present invention is in a disk ejecting position.

FIG. 2 shows a state in which a top plate 16 of the housing 4 has been removed, and the tray 6 has moved to the disk reproducing position. In this state, the tray 6 has been received by the housing 4. FIG. 3 shows a state in which the top plate 16 of the housing 4 has been removed, and the tray 6 has moved to the disk ejecting position. In this state, the tray 6 projects outside the housing 4. The tray 6 is supported by the tray sliding mechanism 8 which comprises two guide rails 8a, 8b, slides in the directions of arrows A, B, shown in FIGS. 2 and 3, and reaches the disk ejecting position or the disk reproducing position.

Figure 4:
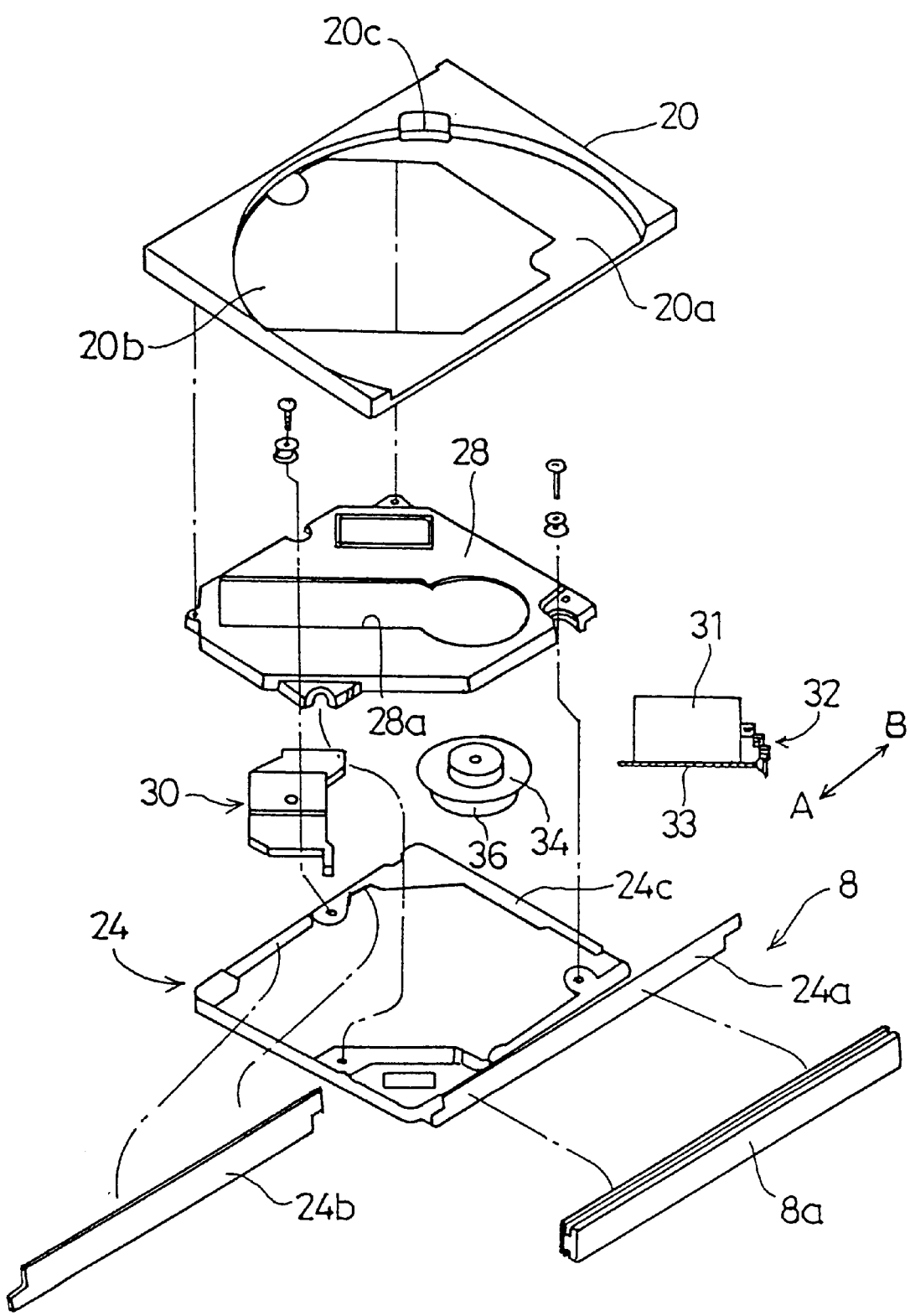
FIG. 4 shows an exploded perspective view showing a structure of the tray of the disk drive device in the embodiment of the present invention.
Figure 5:
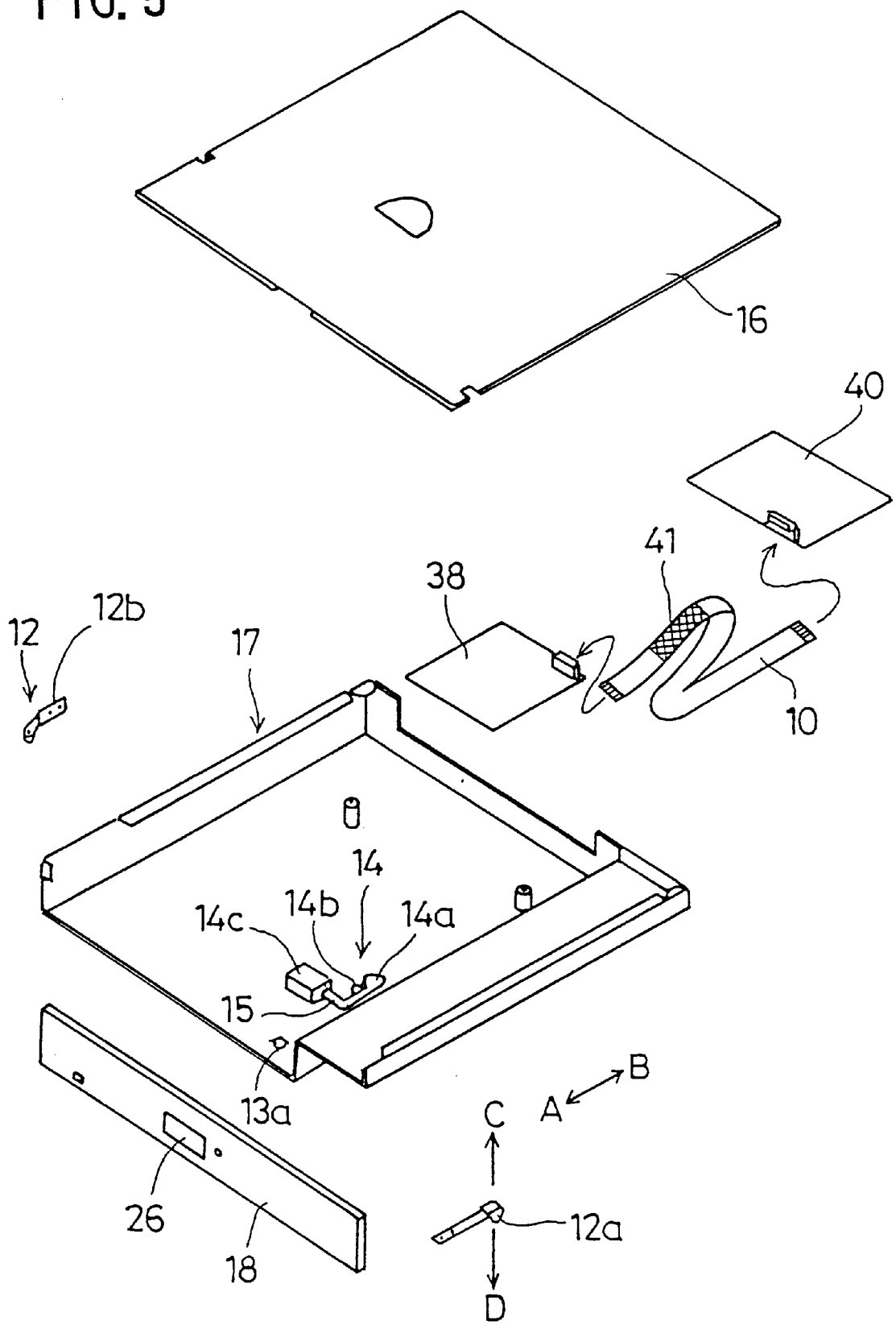
FIG. 5 shows an exploded perspective view showing a housing of the disk drive device in the embodiment of the present invention.

FIG. 4 shows an arrangement of the tray 6, and FIG. 5 shows an arrangement of the housing 4.

The tray 6 includes a bezel 18, a tray frame 20, a driving unit 22, a sub-chassis 24, and so forth. The housing 4 includes the top plate 16, a chassis 17, and so forth.

As shown in FIG. 3, the bezel 18 is fixed at the front end of the tray frame 20, and slides integrally with the tray 6 in the directions A, B, shown in the figure. When the tray 6 has been received by the housing 4, the bezel 18 covers the housing 4 as a lid, as shown in FIG. 2. At the center of the bezel 18, a switch button 26, for releasing locking of the tray by the locking mechanism 14 when the tray 6 is to project from the housing 4, is provided.

As shown in FIG. 4, the tray frame 20 has a disk placement surface 20a on which the disk is placed, an opening 20b, for a pickup and a turntable, formed in the disk placement surface 20a, and an arc-shaped opening 20c, for removing the disk, in which a finger is inserted when the disk placed on the disk placement surface 20a is to be removed. The disk placement surface 20a is formed so that, for the purpose of easy removal of the disk, the lateral width of the disk placement surface 20a is shorter than the diameter of the disk, and thereby, a portion of the disk placed on the disk placement surface 20a projects from the tray frame 20.

At a front portion and a rear portion of a side surface, of the tray frame 20, in the side in which a movement-preventing member 12b is provided, first and second recess portions (not shown in the figures) are provided. The movement-preventing member 12b engages with the first and second recess portions when the tray 6 is located in the disk reproducing position and when the tray 6 is located in the disk ejecting position.

As shown in FIGS. 2 and 4, the driving unit 22 includes a base 28 which is fixed on a top portion of the sub-chassis 24, the pickup 30 mounted on the base 28, a pickup driving portion 32 which drives and rotates a screw shaft 33 through a motor 31 so as to move the pickup 30 in a radial direction of the disk, the turntable 34 having the disk placed thereon and having a clamp mechanism which clamps the disk on the turntable 34, a turntable driving portion 36 which drives and rotates the turntable 34, and so forth.

The pickup 30 approaches the disk placed on the turntable 34 through a function of the pickup driving portion 32, and reads information recorded on the disk, optically through a laser beam, for example. The pickup 30 is provided so as to face an opening 28a, of the base 28, extending in a radial direction of the disk, and can move in the radial direction of the disk as a result of being driven by the pickup driving portion 32.

The turntable driving portion 36 has a disk motor which drives and rotates the disk clamped on the turntable 34 at a fixed speed when the tray 6 has reached the disk reproducing position.

The sub-chassis 24 is a stand on which the tray frame 20 is placed and fixed. The sub-chassis 24 includes a rectangular frame body 24c having an opening for the pickup 30 and the turntable 34, and brackets 24a, 24b provided on opposite-side surfaces of the frame body 24c and extending in the directions of the arrows A, B, shown in FIG. 4.

As shown in FIGS. 3 and 4, the tray sliding mechanism 8 includes the guide rails 8a, 8b having the same shape, and the brackets 24a, 24b of the sub-chassis 24 are fitted to the guide rails 8a, 8b, respectively. Further, the guide rails 8a, 8b are fitted to side surfaces 17a, 17b of the chassis 17, respectively. Thereby, through the tray sliding mechanism 8, the tray 6 is guided slideably in the directions of the arrows A, B.

As shown in FIG. 5, a movement-preventing mechanism 12 includes a movement-preventing member 12a and the movement-preventing member 12b. The movement-preventing member 12a engages with a movement-preventing hole 13a formed in the chassis 17 when the tray 6 has moved to the disk ejecting position. The movement-preventing member 12b engages with the second recess portion (not shown in the figures) present at the rear portion of the side surface of the tray 6 and prevents the tray 6 from moving. Each of the movement-preventing members 12a, 12b, the movement-preventing hole 13a, and the first and second recess portions has a rounded contact portion. Thereby, when a force larger than a predetermined force is applied to the tray 6, the movement prevention of the tray 6 is released.

The locking mechanism 14 includes a locking lever 14a having a solenoid 14c, a movement-preventing roller 14b and a plunger 15. When the tray 6 has moved to the disk reproducing position in the housing 4, in the locking mechanism 14, the locking lever 14a mounted on the bottom surface of the frame body 24c of the sub-chassis 24 engages with the movement-preventing roller 14b provided on a bottom portion of the chassis 17. Thereby, the sub-chassis 24 is locked with the chassis 17.

When the switch button 26 of the bezel 18 is pressed, the solenoid 14c mounted on the bottom surface of the frame body 24c is excited, and attracts the plunger 15 which is coupled with an end of the locking lever 14a. Thereby, the locking lever 14a is removed from the movement-preventing roller 14b, and, thus, the locking is released.

At a bottom portion of the tray 6, a substrate 38 for driving the respective portions of the driving unit 22 is mounted. In the housing 4, a substrate 40 for external connection is provided. Disk reproducing components which comprise the pickup 30, turntable 34, pickup driving portion 32, turntable driving portion 36 and so forth of the driving unit 22 are connected with the flexible cable 10 via the substrate 38. Thus, the disk reproducing components are connected to the substrate 40 via the substrate 38 and the flexible cable 10. As a result, the pickup 30, turntable 34, pickup driving portion 32, turntable driving portion 36 and so forth perform predetermined operations in accordance with external control signals.

Figure 6:
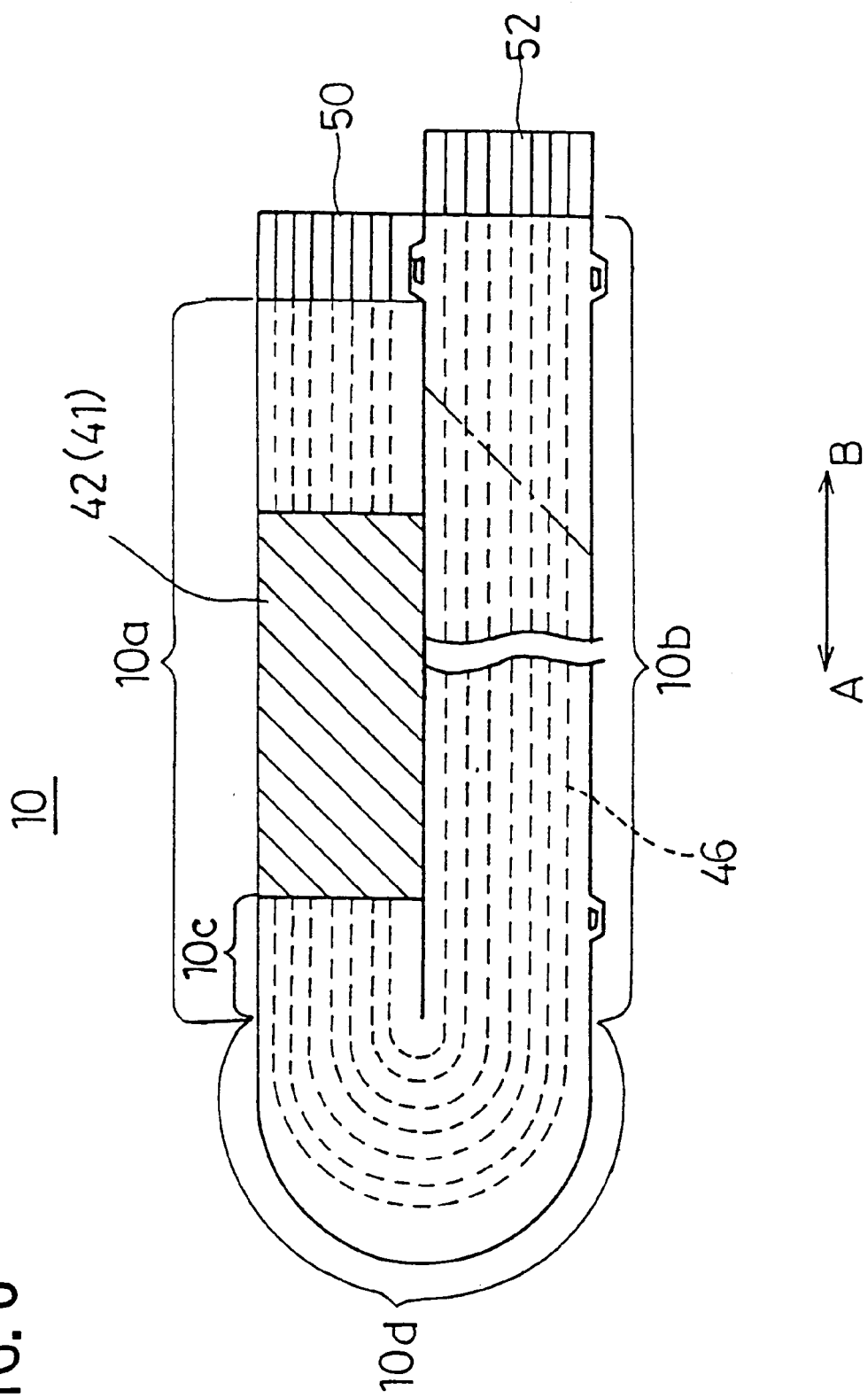
FIG. 6 shows a plan view showing a structure of a flexible cable of the disk drive device in the embodiment of the present invention.
Figure 7:
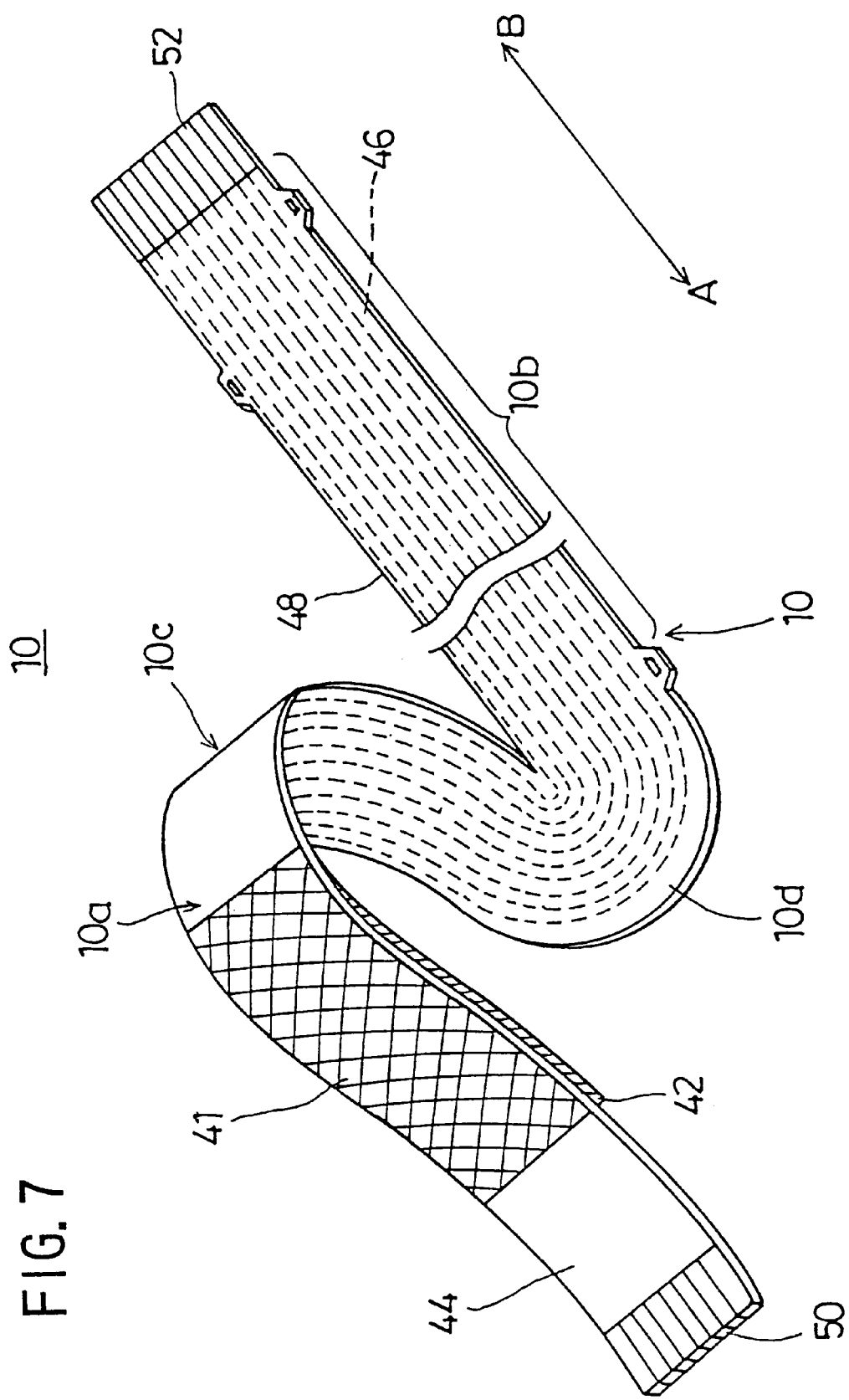
FIG. 7 shows a perspective view showing the structure of the flexible cable shown in FIG. 6.

FIG. 6 shows a plan view of the flexible cable 10, and FIG. 7 shows a perspective view of the flexible cable 10 in a condition where a curve portion 10c curves.

Figure 8A:
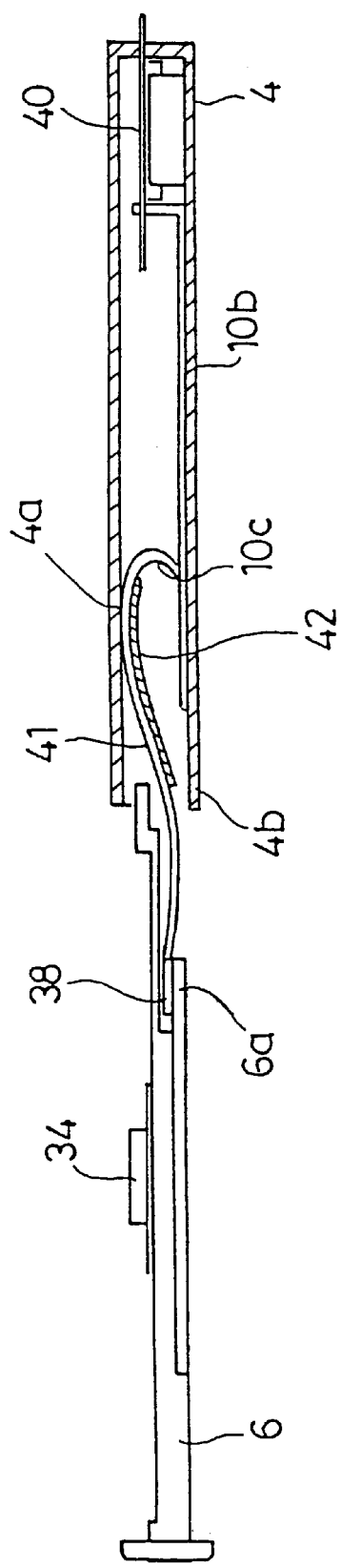
FIGS. 8A and 8B show conditions in which the tray of the disk drive device in the embodiment of the present invention is received by the housing.

As shown in FIG. 7, the flexible cable 10 extends in the directions of sliding of the tray 6 (the directions of the arrows A, B shown in the figure). The flexible cable 10 includes a fixed portion 10b which is fixed onto the chassis 17 of the housing 4, and a movable portion 10a which moves in response to sliding of the tray 6 and includes the curve portion 10c. The fixed portion 10b and the movable portion 10a are connected by a U-shaped bent portion 10d. The curve portion 10c is located adjacent to the U-shaped bent portion 10d, and is a portion of the movable portion 10a, which portion curves most sharply when the tray 6 is in the disk ejecting position as shown in FIG. 8A.

In the flexible cable 10, conductive patterns 46 are disposed on a film-shaped first insulating layer 44 having the property of insulation, and are covered by a second insulating layer 48 having the property of insulation for protection of the conductive patterns 46. A reinforced portion 41 is provided between the curve portion 10c of the movable portion 10a and a first connector 50.

Silk-screen printing of a paint is performed on a surface of the reinforced portion 41, which surface is a bottom surface when the flexible cable 10 is provided in the disk drive device 2 and the tray 6 is in the disk ejecting position. Through the silk-screen printing, a reinforcement film 42 is formed on the bottom surface of the reinforced portion 41. As a result, the rigidity of the reinforced portion 41 is higher than the rigidity of the other portions of the flexible cable 10.

The portions of the first connector 50 and a second connector 52 are not covered by the second insulating layer 48. The first and second connectors 50 and 52 are connected with the substrates 38 and 40 as connection terminals of the flexible cable 10, respectively.

The material of the insulating layers 44 and 48 is polyimide, polyester, polyurethane, acrylic resin or the like. It is preferable that the material be selected appropriately in consideration of the operating temperature, manufacturing cost and so forth of the disk drive device 2.

Although, when the tray 6 is in the disk ejecting position, the silk-screen printing of the paint is performed on the bottom surface of the to reinforced portion 41 of the flexible cable 10 in this embodiment, there is a case where it is preferable that the silk-screen printing be performed on the top and bottom surfaces or on the top surface, when the tray 6 is in the disk ejecting position, of the reinforced portion 41, in consideration of a material of the paint, a structure of the housing 4 or the like. Further, in order to increase the rigidity of the reinforced portion 41 of the flexible cable 10, it is possible to use another method other than the method of the silk-screen printing of the paint.

The flexible cable 10 electrically connects the substrate 38 of the tray 6 and the substrate 40 of the housing 4, and is arranged in the housing 4 in a condition in which the flexible cable 40 is curved as shown in FIG. 7. Further, the movable portion 10a follows a sliding motion of the tray 6 and moves in the housing 4, and, thus, a sliding operation of the tray 6 is not obstructed by the flexible cable 10.

Operations of the disk drive device 2 having the above-described arrangement will now be described.

Before the disk is loaded in the disk drive device 2, the tray 6 is contained in the housing 4. In the condition in which the tray 6 is contained in the housing 4, the locking lever 14a of the locking mechanism 14 provided on the bottom surface of the sub-chassis 24 is engaged with the movement-preventing roller 14b provided on the bottom portion of the chassis 17, as shown in FIG. 5. Also, the movement-preventing member 12b is fitted into the first recess portion (not shown in the figures) of the side surface of the tray 8. Thus, the tray 6 is prevented from moving in the housing 4.

When the switch button 26 of the bezel 18 is pressed, the plunger 15 is attracted by the magnetic force of the solenoid 14, the locking lever 14a coupled with the plunger 15 is removed from the movement-preventing roller 14b, and, thus, the locking is released.

Then, the bezel 18 is manually pulled in the direction A, and, thereby, the tray 6 slides in the A direction while the tray 6 is guided by the guide rails 8a, 8b. When the tray 6 has been drawn, has projected from the housing 4, and has moved to the disk ejecting position, as shown in FIG. 3, a movement-preventing portion of the movement-preventing member 12b is fitted into the second recess portion (not shown in the figures) of the side surface of the tray 6 with a click, and also, a movement-preventing portion of the movement-preventing member 12a moves in the direction D, shown in FIG. 5, so as to be fitted into the movement-preventing hole 13a. Thereby, the tray 6 is prevented from moving in the disk ejecting position, and, thus, sliding of the tray 6 in the direction A is prevented.

When the tray 6 is prevented from moving in the disk ejecting position, the disk may be placed on the turntable 34.

After the disk has been placed on the turntable 34, the bezel 18 is pressed in the direction B. When the bezel 18 is pressed in the direction B, the movement-preventing portion of the movement-preventing member 12b is removed from the second recess portion (not shown in the figures) of the side surface of the tray 6, and the movement-preventing portion of the movement-preventing member 12a moves in the direction C shown in FIG. 5 so as to be removed from the movement-preventing hole 13a. Thus, the movement prevention of the tray 6 is released.

When the bezel 18 is further pressed in the direction B, the tray 6 slides while the tray 6 is guided by the pair of guide rails 8a, 8b, and, then, the tray 6 returns to the disk reproducing position shown in FIG. 2.

When the tray 6 has reached the disk reproducing position, the movement-preventing portion of the movement-preventing member 12b is fitted into the first recess portion (not shown in the figures) of the side surface of the tray 6 with a click, and, also, the locking lever 14a of the locking mechanism 14 is again engaged with the movement-preventing roller 14b of the chassis 17. At this time, by the click occurring when the movement-preventing portion of the movement-preventing member 12b is fitted into the first recess portion (not shown in the figures) of the side surface of the tray 6, it is recognized that the tray 6 has reached the disk reproducing position.

Figure 8B:
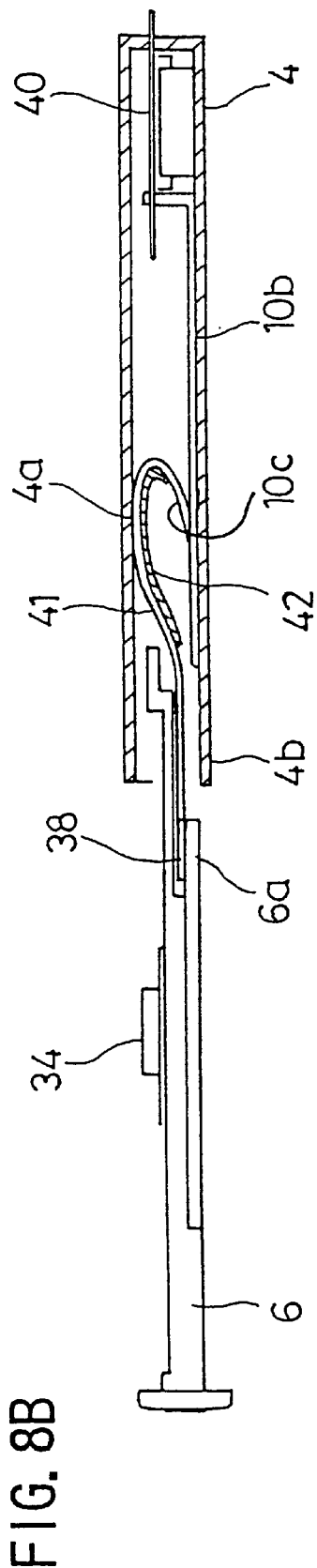

FIGS. 8A and 8B shows side elevational sectional views showing conditions of the flexible cable 10 in the sliding operation of the tray 6. FIG. 8A shows the condition in which the tray 6 is caused to project from the housing 4 and is in the disk ejecting position. FIG. 8B shows the condition in which the tray 6 is being received by the housing 4.

Because the silk-screen printing of the paint has been performed on the bottom surface of the reinforced portion 41 of the flexible cable 10, and, thereby, the rigidity of the reinforced portion 41 has been improved, the reinforced portion 41 is not likely to bend. As a result, the surfaces of the reinforced portion 41 of the flexible cable 10 are smooth. Further, in the condition of FIG. 8A, the radius of curvature of the curve portion 10c is relatively small.

As a result, the sliding frictional resistance between the reinforcement portion 41 and the inner surface 4a of the housing 4 is reduced. Thereby, when the tray 6 moves from the disk ejecting position and is being received by the housing 4, the movable portion 10a of the flexible cable 10 moves smoothly in the housing 10, and, thereby, it is prevented that the flexible cable 10 projects from the gap between a rear end portion 6a of the tray 6 and a front end portion 4b of the housing 4 and is sandwiched therebetween. Thus, the movable portion 10a of the flexible cable 10 moves so as to follow the movement of the tray 6 into the housing 4, and the flexible cable 10 does not project from the gap between the rear end portion 6a of the tray 6 and the front end portion 4b of the housing 4 until the tray 6 is contained in the housing 4.

Thus, because the reinforced portion 41 does not bend much, the surfaces of the reinforced portion 41 are smooth, as mentioned above, and, thereby, the contact frictional resistance between the reinforced portion 41 of the flexible cable 10 and the inner surface 4a of the housing 4 is small. Accordingly, as mentioned above, it is prevented that the contact frictional resistance between the flexible cable 10 and the inner surface 4a of the housing 4 causes a portion of the movable portion 10a of the flexible cable 10 to project from the gap between the rear end portion 6a of the tray 6 and the front end portion 4b of the housing 4, such that the portion of the movable portion 10a of the flexible cable 10 is sandwiched between the rear end portion 6a of the tray 6 and the front end portion 4b of the housing 4. Therefore, it is prevented that the tray 6 is not completely received by the housing 4, and, also, it is prevented that the flexible cable is damaged. Further, because the contact pressure between the flexible cable 10 and the inner surface 4a of the housing 4 is very small, the flexible cable 10 is prevented from being damaged due to this contact.

Although the above-described embodiment is the disk drive device 2, for the notebook-type computer, in which the disk is the CD-ROM and information of the disk is optically read, the present invention can be applied not only to the CD-ROM drive device but also to another disk drive device, for example, a CD drive device, a magnetic-disk drive device, an optical-disk drive device, a magneto-optical-disk drive device, or the like.

Further, although the tray 6 is moved manually in the above-described embodiment, the present invention can also be applied to a disk drive device in which the tray is slid by driving means such as a motor or the like.

Further, the present invention is not limited to the above-described embodiment, and variations and modifications may be made without departing from the scope of the present invention.

The contents of the basic Japanese Patent Application No.9-302142, filed on Nov. 4, 1997 are hereby incorporated by reference.

What is claimed is:

1. A disk drive device comprising:

a disk tray;

a housing for movably supporting said disk tray so that said disk tray is movable between a disk ejecting position for replacing a disk from said tray and a disk loaded position;

said housing including a housing connector;

a disk driving part for writing/reading information to/from the disk in said disk tray when said disk tray is in the disk loaded position;

an electric wiring substrate attached to a bottom surface of said disk tray and having a substrate connector;

a flexible cable having an approximately U-shape configuration and having two legs connected to said substrate connector and to said housing connector respectively with the legs of said flexible cable having respective surface portions and extending in a direction opposite to the direction in which said disk tray is movably drawn from said housing, and wherein one of said legs of said flexible cable is fixed to said housing, with the other leg being bendably configured such that the bendable leg will bend when said disk tray is movably drawn from the housing and will straighten out when said disk tray is contained in said housing and wherein said flexible cable includes a reinforcement film formed on a surface portion of said bendable leg at a position of said flexible cable at which the bendable leg bends, said reinforcement film bending when said bendable leg bends.

2. The disk drive device as claimed in claim 1, wherein said reinforcement film is formed as a result of silk-screen printing of a paint.

* * * * *